United States Patent [19]
Lasmar

[11] Patent Number: 5,267,375
[45] Date of Patent: Dec. 7, 1993

[54] HEATER CLAMP WITH CONICAL FORCE APPLICATION ELEMENTS

[75] Inventor: Brahim Lasmar, Huntsville, Ala.

[73] Assignee: Thermal Corporation, Madison, Ala.

[21] Appl. No.: 893,243

[22] Filed: Jun. 3, 1992

[51] Int. Cl.$^5$ .............................................. F16L 33/02
[52] U.S. Cl. ........................................ 24/268; 432/225
[58] Field of Search ............... 24/19, 268, 279, 20 LS, 24/20 TT, 483; 432/225

[56] References Cited

U.S. PATENT DOCUMENTS

| | | | |
|---|---|---|---|
| 2,205,474 | 6/1940 | Goeller | 24/268 X |
| 2,627,635 | 2/1953 | Seltzer | 24/268 |
| 2,802,993 | 8/1957 | Mathern et al. | 24/268 X |
| 2,922,212 | 1/1960 | Textrom | 24/268 |
| 3,916,507 | 11/1975 | McGrath | 24/268 X |
| 4,968,247 | 11/1990 | Olson | 432/225 |
| 5,024,404 | 6/1991 | Ballard | 24/268 X |

*Primary Examiner*—James R. Brittain
*Attorney, Agent, or Firm*—Phillips & Beumer

[57] ABSTRACT

A clamp for tightening heating coils around a cylindrical object being heated has a split tubular housing with straps extending from each housing edge and forming loops pulled together by forces exerted from a pair of wedging elements with conical surfaces. The wedging elements have a cylindrical portion journalled in loops connected to one housing edge and a conical inner portion on which a strap connected to the other housing edge is mounted. Movement of the wedging elements axially with respect to one another changes the effective diameter of the conical portions engaging the strap. This causes the housing edges to be pulled together. Movement of the wedging elements with respect to one another is provided by securing one element to a mounting pin and providing a threaded bore through the other element, the element with the bore being restrained from rotation. When threads on the pin engage the threaded bore, the elements are pulled together.

5 Claims, 2 Drawing Sheets

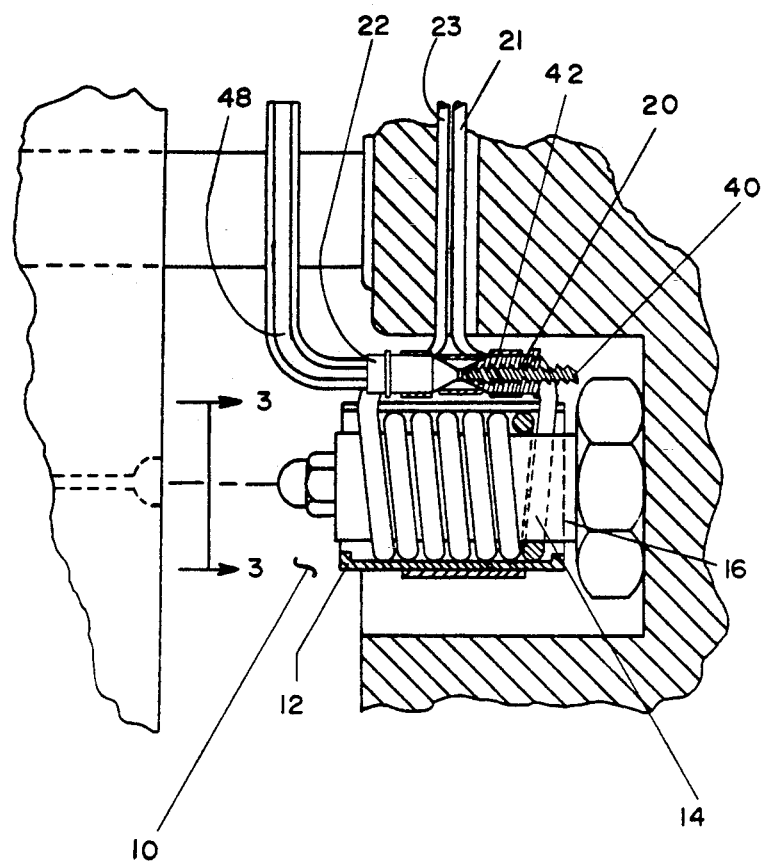
FIG. 1
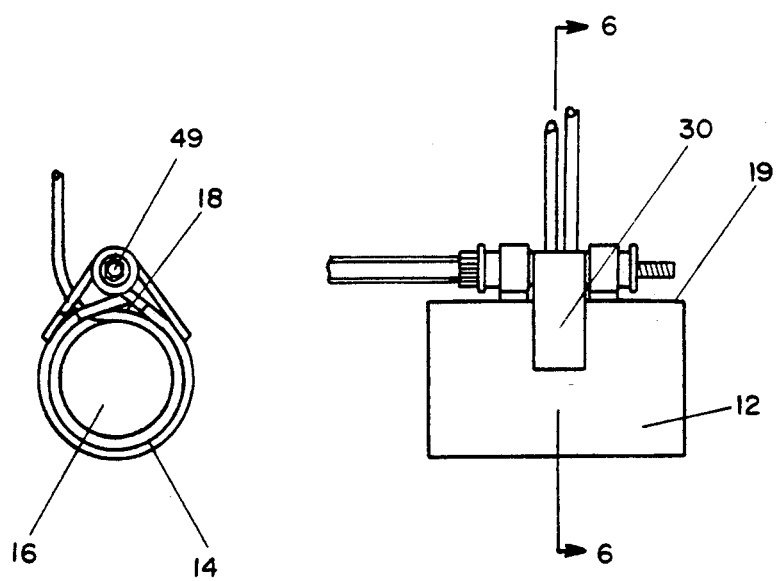
FIG. 3
FIG. 2

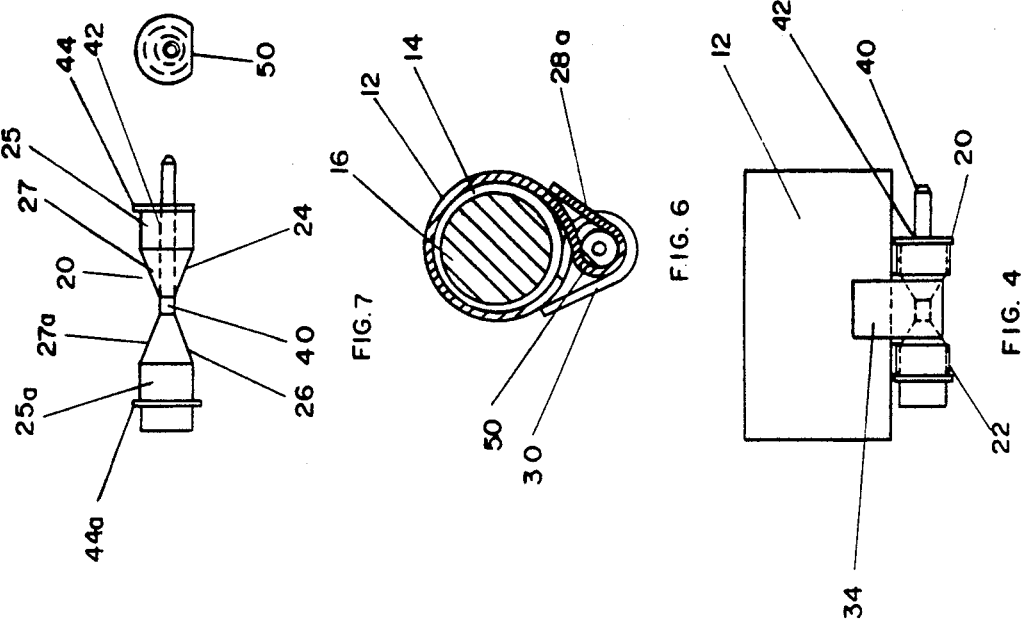
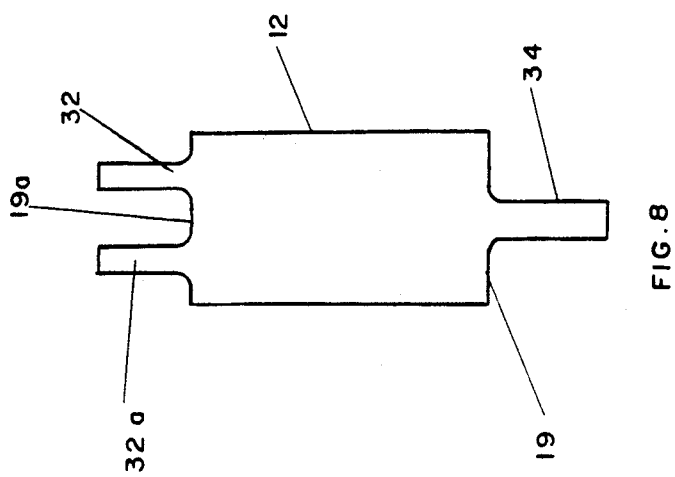
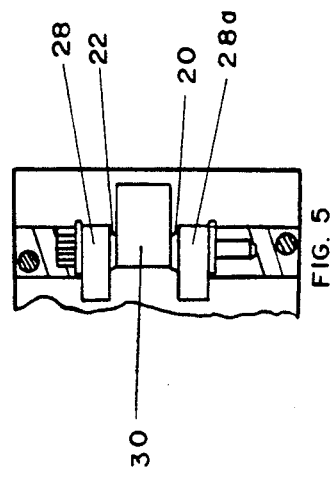

# 5,267,375

HEATER CLAMP WITH CONICAL FORCE APPLICATION ELEMENTS

FIELD OF THE INVENTION

This invention relates to clamping devices for tightening a heater against a cylindrical surface.

BACKGROUND OF THE INVENTION

One of the requirements for injection molding of thermoplastic material into usable objects is to provide an effective means for heating of nozzles through which the molten thermoplastic is supplied. For certain molding equipment such as runnerless molds, the nozzles are located inside the mold, with limited space available for heater clamp mechanisms. Nozzles used for this purpose typically have a cylindrical body to which heat is supplied by a helical element placed to surround and come into contact with the surface of the nozzle. For maximum heat transfer, an outer housing in the form of a piece of split tubing is used to compress the heating element against the nozzle, with edges of the tubing being forced together mechanically so as to provide clamping action. The heating element nozzle and housing in many cases are located in a blind hole with little or no access for adjusting screws at right angles to the nozzle axis. The clamping mechanism used to force edges of the tubing together thus should be operable from an end, rather than from a side, position with respect to the tubing.

Various approaches to end-operated mechanisms for such heater clamps are disclosed in prior patents. U.S. Pat. No. 4,859,176, issued Aug. 22, 1989, to Meyer, discloses an heater clamp with an adjustment screw that rotates about an axis parallel to the heater. The device of this patent has a clamp tube disposed about a heater element and clips that extend partially around the tube with adjustment screws used to pivot the clips to act on cam-type members formed on the tube. U.S. Pat. No. 4,968,247, issued Nov. 6, 1990, to Olson, is directed to a heater clamp actuated by an axially extending cam pin that has a cam portion mounted in a loop formed from an edge portion of the housing tube. Upon rotating the pin, edges of the housing are forced together by cam action, tightening the housing around the heater. These clamping devices present disadvantages in that the Meyer approach involves a more complex manufacturing requirement with a larger number of more complex parts, and the device of the Olson patent, with its cam moving from unengaged to fully engaged with only a 180° turn of a wrench, is more subject to the cam loosening due to vibration.

SUMMARY OF THE INVENTION

This invention is directed to a clamp for a heater used with injection molding nozzles or other cylindrical objects heated by a surrounding coil, the clamp including a longitudinally split tubular housing which compresses the heating element inward upon application of force to bring edges of the split housing together. A pair of journals are provided by loops extending from one edge of the housing for supporting a pair of axially aligned wedging elements mounted on a rotatable threaded pin. The wedging elements have a cylindrical portion at their outer ends, providing a surface that engages the first and second loops and an inner conical portion for exerting a variable wedging force upon movement of the elements together or apart. A third loop formed on the opposite edge of the housing extends over the middle of the wedging elements and is engageable with the elements in a manner such that axial movement of the elements with respect to one another by the pin forces the elements together or apart. The facing conical surfaces in contact with edges of the third loop change the effective diameter of the housing when moved axially by the mounting pin. Tightening and loosening of the clamp may be readily carried out by rotating the pin with a wrench or screwdriver inserted from an accessible end of the clamp.

Heater clamps embodying the invention provide important advantages in that these clamps are simple to manufacture, and they provide a high degree of resistance to loosening.

BRIEF DESCRIPTION OF THE DRAWINGS

FIG. 1 is a side elevational view of a heater clamp embodying the invention shown in place on an injection molding nozzle, with parts in section and parts broken away.

FIG. 2 is a side elevational view of the clamp housing and wedging elements.

FIG. 3 is an end elevational view of the clamp housing as taken along line 3—3 of FIG. 1.

FIG. 4 is a side elevational view taken from an opposite side of FIG. 2.

FIG. 5 is a top plan view of the heater clamp housing.

FIG. 6 is a sectional view as taken along line 6—6 of FIG. 2.

FIG. 7 is a side view of wedging elements used with the clamp of the present invention.

FIG. 8 is a flat layout of the housing before forming it into clamp shape.

DESCRIPTION OF THE PREFERRED EMBODIMENT

FIG. 1 shows a clamp assembly 10 embodying the invention installed in position to compress a slit tube housing 12 against a helical heating element 14 so that the heating element is brought into effective heat transfer contact with the cylindrical outer surface of an injection molding nozzle 16. The housing has a slit 18 defined by opposing edges 19, 19a which are forced together by clamping means provided by the invention to maximize heat transfer with the tube diameter in effect being reduced upon being clamped.

Electrical lead wires 21, 23 extend to the heater from a source not shown. As shown in FIG. 8, tubular housing 12 is formed from a flat piece of metal such as stainless steel and has a pair of spaced-apart straps 32, 32a extending outward from an edge 19a and a single strap 34 extending outward from edge 19. Straps 32, 32a are formed into loops 28, 28a by being folded over and having their ends tack welded to the housing. Strap 34 is similarly folded over to form a loop 30 disposed between and in axial alignment with loops 28, 28a.

Clamping action is carried out by means of a pair of wedging elements 20 and 22 arranged to be mounted in the loops 28, 28a in a manner such that, upon rotation of one element with respect to the other, and thereby varying their axial distance from one another, surfaces of the wedging elements will interact with edges of loop 30, pulling housing edges 19, 19a together and tightening the clamp.

Wedging elements 20, 22 (FIG. 7) each have a generally cylindrical outer end portion 25, 25a and a frustroconical portion 27, 27a at their inner ends, providing opposing conical surfaces 24, 26. A slight lip 44, 44a is provided at the outer end of each wedging element and around its circumference to prevent the elements from sliding out of position. The wedging elements are arranged to be movable toward and apart from one another upon rotation of pin 40. Element 22, at the end of clamp which is accessible to being reached with a tool for rotating the pin, is fixedly secured to or made integral with the pin. This element is journalled for rotation within loop 28 upon turning the pin. Opposing element 20 has an axial bore 42 extending through its length to receive threaded pin 40 so that upon being tightened the pin will draw the opposing elements together. A socket 49 is provided in the outer end of element 22 for being engaged by a key or wrench 48 by means of which the pin is rotated.

Element 20 is secured within loop 28a but is held in fixed circumferential position instead of being allowed to rotate. This is accomplished by providing a flat surface 50 parallel to the axis of the pin by removing a segment of its cylindrical portion and lip at its outer end. The flat surface is located to engage loop 28a and thereby be restricted from rotation. Upon tightening of pin 40, element 20 is forced closer to element 22, and conical surface 24 slides under an edge of loop 30 so that the loop is caused to assume a larger diameter which in turn pulls the edges of the housing together. Upon loosening the pin, the elements move apart, reducing the effective diameter of the loop.

While the invention is described above in terms of a thereby, but is limited only as indicated by the appended claims.

I claim:

1. A clamp comprising:

a housing member that is formed generally into a cylindrical shape and which has a longitudinal central axis, a slit extending along the longitudinal length of said housing member on one side thereof forming edges that are spaced apart, said edges comprising first and second edges which, when moved together, will reduce the diameter of the cylindrical housing;

pin means disposed along said slit;

a pair of wedging elements mounted on said pin means in axial alignment with one another and arranged for relative axial movement with respect to one another said wedging elements comprising an inner frustroconical portion having a reduced diameter in the direction of the other element and an outer portion of generally cylindrical shape;

journal means secured to said first housing edge and comprising a pair of straps forming loops, each engaging a said outer portion of a said wedging element;

a strap secured to said second housing edge, disposed around a said wedging elements and arranged so that each edge of the strap is in contact with an inclined surface of a wedging element; and means for axially moving at least one of said elements with respect to the other, whereby facing inclined surfaces of said elements will present a varied effective mounting diameter to said strap, and the housing edges will be brought together or allowed to pull apart.

2. A clamp as defined in claim 1 including a lip at the outer end of each said wedging element for retaining said strap in position.

3. A clamp as defined in claim 1 wherein said means for moving at least one of said elements comprises a pin fixedly secured to a first one of said elements and having threads engaging threads in a bore of a second of said elements, means preventing rotation of said second element and means for rotating the pin whereby rotation of the pin will cause the second element to move with regard to the first.

4. A clamp as defined in claim 3 wherein said means preventing rotation of said second element comprises a surface defined in an end portion parallel to the pin axis and engageable with a said loop in fixed position.

5. A clamp as defined in claim 4 wherein said strap and said pair of straps comprise circumferential extensions of said housing edges formed integral therewith.

* * * * *